United States Patent
Heikes et al.

(10) Patent No.: US 7,653,693 B2
(45) Date of Patent: Jan. 26, 2010

(54) METHOD AND SYSTEM FOR CAPTURING INSTANT MESSAGES

(75) Inventors: Brian Dean Heikes, Ashburn, VA (US); Kristine Amber Krantz, Alexandria, VA (US); Kelly Monroe Mathews, Bristow, VA (US); Russell Scott Medeiros, Ashburn, VA (US); Venkatesh Ramanathan, Herndon, VA (US); Richard W. Robinson, Jr., Reston, VA (US); Perry E. Miranda Roman, Arlington, VA (US); Edward L. Sears, Reston, VA (US); Andrew L. Wick, McLean, VA (US); Deborah Ruth Yurow, Arlington, VA (US)

(73) Assignee: AOL LLC, Dulles, VA (US)

( * ) Notice: Subject to any disclaimer, the term of this patent is extended or adjusted under 35 U.S.C. 154(b) by 958 days.

(21) Appl. No.: 10/825,617

(22) Filed: Apr. 16, 2004

(65) Prior Publication Data
US 2005/0055416 A1      Mar. 10, 2005

Related U.S. Application Data

(60) Provisional application No. 60/531,988, filed on Dec. 24, 2003, provisional application No. 60/500,369, filed on Sep. 5, 2003.

(51) Int. Cl.
*G06F 13/00* (2006.01)
(52) U.S. Cl. .................................................. 709/206
(58) Field of Classification Search .................. 709/206
See application file for complete search history.

(56) References Cited

U.S. PATENT DOCUMENTS 5,086,394 A    2/1992  Shapira
5,101,424 A    3/1992  Clayto et al.
5,276,905 A    1/1994  Hurst
5,548,637 A    8/1996  Heller
5,619,648 A    4/1997  Canale et al.
5,694,616 A    12/1997 Johnson
5,793,365 A    8/1998  Tang
5,796,948 A    8/1998  Cohen (Continued)

FOREIGN PATENT DOCUMENTS

| GB | 2357932 | 7/2001 |
|----|---------|--------|
| GB | 2368747 | 5/2002 |
| WO | WO 00/79396 | 12/2000 |
| WO | WO 01/06748 | 1/2001 |
| WO | WO 01/67787 | 9/2001 |
| WO | WO 02/03216 | 1/2002 |
| WO | WO 2005/086723 | 9/2005 |

(Continued)

OTHER PUBLICATIONS

Ignite Software: Parent Tools Feature Set, "Parent Tools Features," http://www.parent-tools.com/features.htm, Ignite Software, pp. 1-3, as accessed on Dec. 10, 2003.
Parent Tools—The Ultimate in Monitoring and Controlling AIMe, "Parent Tools for AIM," http://www.parent-tools.com/screenshots. htm, pp. 1-4, as accessed on Dec. 10, 2003.

(Continued)

*Primary Examiner*—Robert B Harrell
(74) *Attorney, Agent, or Firm*—Fish & Richardson P.C.

(57) ABSTRACT

Managing instant messages may include receiving instant messages created by or on behalf of one or more message sources for delivery to an intended recipient. From among the received instant messages, qualifying instant messages may be identified that satisfy a capture rule, and two or more of the qualifying instant messages may be captured. The intended recipient may be informed of the captured instant messages unobtrusively, and also may be enabled to manage the captured instant messages.

52 Claims, 11 Drawing Sheets

U.S. PATENT DOCUMENTS

| | | | |
|---|---|---|---|
| 5,802,470 A | 9/1998 | Gaulke | |
| 5,835,722 A | 11/1998 | Bradshaw et al. | |
| 5,867,162 A | 2/1999 | O'Leary | |
| 5,940,488 A | 8/1999 | DeGrazia | |
| 5,987,113 A | 11/1999 | James | |
| 5,999,932 A | 12/1999 | Paul | |
| 6,065,047 A | 5/2000 | Carpenter | |
| 6,065,056 A | 5/2000 | Bradshaw et al. | |
| 6,073,138 A | 6/2000 | de l'Etraz et al. | |
| 6,076,100 A | 6/2000 | Cottrille et al. | |
| 6,088,435 A | 7/2000 | Barber | |
| 6,112,181 A | 8/2000 | Shear | |
| 6,128,739 A | 10/2000 | Fleming, III | |
| 6,161,130 A | 12/2000 | Horvitz et al. | |
| 6,175,831 B1 | 1/2001 | Weinreich et al. | |
| 6,199,103 B1 | 3/2001 | Sakaguchi et al. | |
| 6,247,043 B1 | 6/2001 | Bates | |
| 6,269,369 B1 | 7/2001 | Robertson | |
| 6,301,609 B1 * | 10/2001 | Aravamudan et al. | 709/207 |
| 6,311,211 B1 | 10/2001 | Shaw | |
| 6,324,541 B1 | 11/2001 | de l'Etraz | |
| 6,330,590 B1 | 12/2001 | Cotten | |
| 6,347,332 B1 | 2/2002 | Malet | |
| 6,374,246 B1 | 4/2002 | Matsuo | |
| 6,374,290 B1 | 4/2002 | Scharber et al. | |
| 6,389,372 B1 | 5/2002 | Glance et al. | |
| 6,393,464 B1 | 5/2002 | Dieterman | |
| 6,415,318 B1 | 7/2002 | Aggarwal | |
| 6,421,439 B1 | 7/2002 | Liffick | |
| 6,421,675 B1 | 7/2002 | Ryan | |
| 6,421,709 B1 | 7/2002 | McCormick et al. | |
| 6,430,604 B1 | 8/2002 | Ogle | |
| 6,449,634 B1 | 9/2002 | Capiel | |
| 6,480,885 B1 | 11/2002 | Olivier | |
| 6,507,866 B1 | 1/2003 | Barchi | |
| 6,519,639 B1 | 2/2003 | Glasser et al. | |
| 6,549,937 B1 | 4/2003 | Auerbach | |
| 6,571,234 B1 | 5/2003 | Knight | |
| 6,615,241 B1 | 9/2003 | Miller et al. | |
| 6,640,218 B1 | 10/2003 | Golding | |
| 6,647,383 B1 | 11/2003 | August | |
| 6,677,968 B1 | 1/2004 | Appelman | |
| 6,678,719 B1 | 1/2004 | Stimmel | |
| 6,697,807 B2 | 2/2004 | McGeachie | |
| 6,731,308 B1 | 5/2004 | Tang | |
| 6,732,155 B2 | 5/2004 | Meek | |
| 6,750,881 B1 | 6/2004 | Appelman | |
| 6,772,188 B1 | 8/2004 | Cloutier | |
| 6,788,769 B1 | 9/2004 | Waites | |
| 6,800,031 B2 | 10/2004 | Di Cesare | |
| 6,832,245 B1 | 12/2004 | Isaacs | |
| 6,901,559 B1 | 5/2005 | Blum | |
| 6,912,563 B1 | 6/2005 | Parker | |
| 6,917,965 B2 | 7/2005 | Gupta | |
| 7,039,639 B2 | 5/2006 | Brezin | |
| 7,117,254 B2 | 10/2006 | Lunt et al. | |
| 7,177,880 B2 | 2/2007 | Ruvoio | |
| 7,181,498 B2 | 2/2007 | Zhu et al. | |
| 7,188,153 B2 | 3/2007 | Lunt et al. | |
| 7,269,590 B2 | 9/2007 | Hull et al. | |
| 7,313,760 B2 | 12/2007 | Grossman | |
| 2001/0005861 A1 | 6/2001 | Mousseau | |
| 2002/0042830 A1 * | 4/2002 | Bose et al. | 709/230 |
| 2002/0049806 A1 | 4/2002 | Gatz et al. | |
| 2002/0065856 A1 | 5/2002 | Kisiel | |
| 2002/0065894 A1 | 5/2002 | Dalal | |
| 2002/0083136 A1 | 6/2002 | Whitten, II | |
| 2002/0091667 A1 | 7/2002 | Jaipuria et al. | |
| 2002/0103801 A1 | 8/2002 | Lyons | |
| 2002/0112181 A1 | 8/2002 | Smith | |
| 2002/0116463 A1 | 8/2002 | Hart | |
| 2002/0116641 A1 | 8/2002 | Mastrianni | |
| 2002/0133369 A1 | 9/2002 | Johnson | |
| 2002/0175953 A1 | 11/2002 | Lin | |
| 2002/0178161 A1 | 11/2002 | Brezin | |
| 2002/0181703 A1 | 12/2002 | Logan et al. | |
| 2002/0184089 A1 | 12/2002 | Tsou | |
| 2002/0199095 A1 | 12/2002 | Bandini et al. | |
| 2003/0004855 A1 | 1/2003 | Dutta | |
| 2003/0004872 A1 | 1/2003 | Gardi | |
| 2003/0023684 A1 * | 1/2003 | Brown et al. | 709/204 |
| 2003/0023875 A1 | 1/2003 | Hursey | |
| 2003/0028524 A1 | 2/2003 | Keskar | |
| 2003/0028595 A1 | 2/2003 | Vogt et al. | |
| 2003/0037112 A1 | 2/2003 | Fitzpatrick | |
| 2003/0050916 A1 | 3/2003 | Ortega | |
| 2003/0055831 A1 | 3/2003 | Ryan | |
| 2003/0065721 A1 | 4/2003 | Roskind | |
| 2003/0088554 A1 | 5/2003 | Ryan | |
| 2003/0101226 A1 | 5/2003 | Quine | |
| 2003/0105822 A1 | 6/2003 | Gusler | |
| 2003/0131061 A1 | 7/2003 | Newton | |
| 2003/0167324 A1 | 9/2003 | Farnham et al. | |
| 2003/0172349 A1 | 9/2003 | Katayama | |
| 2003/0187813 A1 | 10/2003 | Goldman | |
| 2004/0019650 A1 | 1/2004 | Auvenshine | |
| 2004/0054736 A1 | 3/2004 | Daniell | |
| 2004/0056901 A1 | 3/2004 | March | |
| 2004/0117443 A1 | 6/2004 | Barsness | |
| 2004/0122681 A1 | 6/2004 | Ruvolo | |
| 2004/0122810 A1 | 6/2004 | Mayer | |
| 2004/0122855 A1 | 6/2004 | Ruvolo | |
| 2004/0154022 A1 * | 8/2004 | Boss et al. | 719/310 |
| 2004/0186738 A1 | 9/2004 | Reisman | |
| 2004/0201624 A1 | 10/2004 | Crawford | |
| 2004/0210844 A1 | 10/2004 | Pettinati | |
| 2004/0215648 A1 | 10/2004 | Marshall | |
| 2004/0215721 A1 | 10/2004 | Szeto | |
| 2004/0215793 A1 | 10/2004 | Ryan et al. | |
| 2004/0221309 A1 | 11/2004 | Zaner | |
| 2005/0015432 A1 | 1/2005 | Cohen | |
| 2005/0021750 A1 | 1/2005 | Abrams | |
| 2005/0027382 A1 | 2/2005 | Kirmse | |
| 2005/0038856 A1 | 2/2005 | Krishnasamy | |
| 2005/0050143 A1 | 3/2005 | Gusler | |
| 2005/0055416 A1 | 3/2005 | Heikes | |
| 2005/0076240 A1 | 4/2005 | Appleman | |
| 2005/0076241 A1 | 4/2005 | Appleman | |
| 2005/0114229 A1 | 5/2005 | Ackley | |
| 2005/0177486 A1 | 8/2005 | Yeager | |
| 2005/0197846 A1 | 9/2005 | Pezaris | |
| 2005/0198131 A1 | 9/2005 | Appelman | |
| 2005/0198172 A1 | 9/2005 | Appelman | |
| 2005/0198268 A1 | 9/2005 | Chandra | |
| 2005/0216300 A1 | 9/2005 | Appelman et al. | |
| 2005/0246420 A1 | 11/2005 | Little | |
| 2006/0031772 A1 | 2/2006 | Valeski | |
| 2006/0129678 A1 | 6/2006 | Morita | |
| 2007/0250566 A1 | 10/2007 | Appelman | |
| 2008/0255989 A1 | 10/2008 | Altberg et al. | |
| 2009/0043844 A1 | 2/2009 | Zimmet et al. | |
| 2009/0070306 A1 | 3/2009 | Stroe | |

FOREIGN PATENT DOCUMENTS

| | | |
|---|---|---|
| WO | WO 2005/089286 | 9/2005 |
| WO | WO 2006/068955 | 6/2006 |

OTHER PUBLICATIONS

McMurray, Susan, "Shield your children from unsuitable Internet content," http://www.microsoft.com/canada/home/internet&security/2.4.8_protectwithparentalcontrolshowtosafeguardyourcomputer.asp#, Microsoft Home Magazine, pp. 1-3, as accessed on Dec. 10, 2003.

"Instant Messaging is Everyone's Business," Yahoo Business Messenger, Yahoo! 2003.
"SurfControl Instant Message Filter," Instant Message Filter, SurfControl plc. 2003.
"Spammers Target Instant Message Users," http://www.bizreport.com/article.php?art_id=5507 Nov. 13, 2003, pp. 1-4.
Olsen, Stefanie, "Will instant messaging become instant spamming?,".http:/lnews.com.com/2100-1023-252765.html?legacy=cnet, Feb. 16, 2001, pp. 1-4.
"Protect Your Privacy," MSN Features, http://messenger.msn.com/Feature/Privacy.aspx, as accessed on Dec. 2, 2003.
"Jabber" http://www.jabber.com/index.cgi?CONTENT_ID=9, as accessed on Dec. 4, 2003.
"Knock Settings—Servers Tab," http://www.knockmail.com/support/advserverset.html, pp. 1-2, , as accessed on Dec. 4, 2003.
"Preview Pending Emails in KnockMail," http://www.knockmail.com/support/previewemail.html, pp. 1-2, , as accessed on Dec. 4, 2003.
"Managing your Addresses in Knockmail," http://www.knockmail.com/support/manaddresses.html, pp. 1-2, , as accessed on Dec. 4, 2003.
"Approved Database," http://www.knockmail.com/support/appdatabase.html, pp. 1, , as accessed on Dec. 4, 2003.
"Pending Database for KnockKnock," http://www.knockmail.com/support/penddatabase.html, pp. 1, , as accessed on Dec. 4, 2003.
"Denied Database for KnockKnock," http://www.knockmail.com/support/denydatabase.html, pp. 1, , as accessed on Dec. 4, 2003.
"Email Server Control for KnockKnock," http://www.knockmail.com/support/emailservcont,html, pp. 1-2, , as accessed on Dec. 4, 2003.
"Listserv Control for KnockKnock," http://www.knockmail.com/support/listservcont.html, pp. 1, , as accessed on Dec. 4, 2003.
"Email Server Control for KnockKnock," http://www.knockmail.com/support/emailservcont.html, pp. 1-2, , as accessed on Dec. 4, 2003.
http://www.knockmail.com/support/newsettings.jpg, , as accessed on Dec. 4, 2003.
The Wall Street Journal article "Esniff Ferrets Out Misbehavior By 'Reading' E-Mail, Web Visits," Katherine Lange, interactive.wsj.com, Apr. 27, 2001,:Tech Q&A.
The Early Report-The Early Show segment, "Big Brother In The Corner Office," Julie Chen, cbsnews.com/earlyshow/caught/techage/20001228e_sniff.shtml, Dec. 28, 2000:Tech Age.
"The eSniff Product Overview," eSniff: Define Your e-Boundaries, www.esniff.com/product_overview.html, May 15, 2001.
ICQ 99a, "Welcome to ICQ version 99a", XP-002163918, ICQ Inc., 1998.
R. Hall, "A Countermeasure to Duplicate-detecting Anti-spam Techniques", AT&T Labs Technical Report 99.9.1, 1999.
A. Kolcz and J. Alspector, "SVM-based Filtering of E-mail Spam with Content-specific Misclassification Costs," *TextDM'2001 (IEEE ICDM-2001 Workshop on Text Mining)*, San Jose, CA, 2001.
M. Marvin, "Announce: Implementation of E-mail Spam Proposal", news.admin.net-abuse.misc, Aug.3, 1996.
S. Hird, "Technical Solutions for Controlling Spam in the proceedings of AUUG2002", Melbourne, Sep. 4-6, 2002.
M. Hearst et al., "Support Vector Machines", IEEE Intelligent Systems, Jul./Aug. 1998.
H. Drucker et al., "Support Vector Machines for Spam Categorization", IEEE Transactions on Neural Networks, vol. 10, No. 5, Sept. 1999.
T. Joachims, Text Categorization with Support Vector Machines: Learning with Many Relevant Features, University of Dortmund, Computer Science Dept., LS-8 Report 23, 1998.
J. Dudley, "Telstra targets Net spammers", news.com.au, Dec. 02, 2003.
Bart Massey et al.; "Learning Spam: Simple Techniques for Freely-Available Software", Computer Science Dept., Portland, OR USA, 2003, pp. 1-14.
"Degrees of Separation Email Spam Protection", http://www.halfbakery.com, pp. 1-3.
Leander Kahney, "Will You Buy a Car From This Man?", Oct. 6, 2003, pp. 1-3.

Joanna Glasner, "Social Nets Find Friends in VCs", http://www.wired.com/news , Nov. 17, 2003, pp. 1-3.
Ion Adroutsopoulos et al., "Learning to Filter Spam E-Mail: A Comparison of a Naïve Bayesian and a Memory-Based Approach", University of Athens, pp. 1-12.
Paul Graham, "Better Bayesian Filtering", Jan. 2003, pp. 1-11, http://www.paulgraharn.corn/better.html.
Paul Mutton, "PieSpy Social Network Bot - Inferring and Visualizing Social Networks on IRC", jibble.org, http://lister.linux-srv.anlx.net/piespy, © 2001-2004, pp. 1-18.
Office Action issued on U.S. Appl. No. 10/746,230 on Mar. 17, 2009, 13 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"CrushParty.com: Help," retrieved Jun. 12, 2002 from the World Wide Web: http://www.crushparty.com/help.jsp, 3 pages.
"Digital Artifacts for Remembering and Storytelling: Post History and Social Network Fragments," Viegas et al., retrieved from the World Wide Web: http://we.media.mit.edu/~fviegas/papers/posthistory_snf.pdf, 10 total pages.
"Finding Others Online: Reputation Systems for Social Online Spaces," Jensen et al., Apr. 20-25, 2002, CHI, Minneapolis, Minnesota, vol. 4, Issue 1, pp. 447-454.
"Hottie or Nottie? Web Site Voters Let You Know Whether You Sizzle or Fizzle," Marino, Jul. 11, 2001, Florida Times Union, p. C.1. (2 total pages).
"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 . . . , printed on Nov. 5, 2004 (2 pages).
"Instant Messaging for Gamers," PC Gamer, May 2004, vol. 11, No. 5, (2 pages).
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy.Social Network Bot, reprinted from http://lister.linux-srv.anlx.net/piespy printed on Mar. 11, 2004 (18 pages).
"plaxo," Plaxo, reprinted from http://web.archive.org/web/20041105072256/http://www.plaxo.com/printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Reflections on Friendster, Trust and Intimacy," Danah Boyd. *Ubicomp 2003*, Workshop Application for the Intimate Ubiquitous Computing Workshop. Seattle, WA, Oct. 12-15, 2003, (4 pages).
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim1/Webmessenger-RIM-J2ME-Instant -Messaging-20 . . . , pp. 1-4.
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Nets Find Friends in VCs", Joanna Glasner, Wired News, Nov. 17, 2003, http://www.wired.com/news/culture/0,1284,61227,00.html (4 pages).
"Social Network Fragments: An Interactive Tool for Exploring Digital Social Connections." Danah Boyd, Jeff Potter. Sketch at *SIGGRAPH 2003*. San Diego, California: ACM, Jul. 27-31, 2003, (1 page).

"Social Networking for Business: Release 0.5," Esther Dyson, Esther Dyson's Monthly Report, vol. 21, No. 10, Nov. 25, 2003, www.edventure.com, (36 pages).

"Social Sites Clicking With Investors," Washingtonpost.com: Social Sites Clicking With Investors, reprinted from http://vvww.washingtonpost.com/ac2/wp-dyn/A32066-2003Nov12?language=printer printed on Nov. 5, 2004, (2 pages).

"Social Social Networks: Deodorant for the Soul?," Esther Dyson, Esther Dyson's Monthly Report, vol. 21, No. 11, Dec. 12, 2003, www.edventure.com, (36 pages).

"Socialware: Multiagent Systems for Supporting Network Communities," Hattori et al., Mar. 1999, Association for Computing Machinery, Communications of the ACM, vol. 42, Issue 3, (6 pages).

"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).

"SWF Seeks Attractive Head Shot; To Stand Out, Online Daters Pay for Professional Photos; Cropping out the Ex-Wife," Leiber, Nov. 19, 2003, The Wall Street Journal, p. D.1.

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

"Technology Journal: Changing Chat—Instant Messaging is Taking Off, and For Some Users It's Nuzzling Out the Phone," Nick Wingfield, Asian WSJ, Sep. 2000, (5 pages).

"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).

"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.

"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).

America Online Inc., "AOL Instant Messenger", Aug. 29, 2000, Internet: www.aol.com/aim/, (18 pages).

America Online Inc., New AIM 4.7, Sep. 27, 2001, Internet: http://aim.aol.com, (7 pages).

CNET Networks Inc., "PopUp Killer", Sep. 13, 2001, Internet: download.cnet.com/downloads/0-10059-100-6932612.html, (3 pages).

International Search Report and Written Opinion dated Feb. 15, 2006 for International Application No. PCT/US05/07204, (10 pages).

International Search Report and Written Opinion issued in International Application No. PCT/US05/45663, dated Apr. 11, 2008.

International Search Report issued in Application Serial No. PCT/US05/08476, dated Oct. 16, 2006, (8 pages).

International Search Report issued in International Application No. EP03731244, dated Aug. 30, 2005, (4 pages).

Office Action issued in U.S. Appl. No. 10/146,814, dated Jul. 2, 2007, 15 pages.

Office Action issued in U.S. Appl. No. 10/146,814, dated Dec. 11, 2006, 15 pages.

Office Action issued in U.S. Appl. No. 10/184,002, dated Jan. 9, 2007, 11 pages.

Office Action issued in U.S. Appl. No. 10/334,056, dated Oct. 30, 2008 (19 pages).

Office Action issued in U.S. Appl. No. 10/334,056, dated May 12, 2008 (22 pages).

Office Action issued in U.S. Appl. No. 10/334,056, dated Nov. 5, 2007 (21 pages).

Office Action issued in U.S. Appl. No. 10/334,056, dated May 21, 2007, (7 pages).

Office Action issued in U.S. Appl. No. 10/334,056, dated May 10, 2006, (7 pages).

Office Action issued in U.S. Appl. No. 10/334,056, dated Oct. 31, 2005, 7 pages.

Office Action issued in U.S. Appl. No. 10/334,056, dated Jul. 6, 2005, 24 pages.

Office Action issued in U.S. Appl. No. 10/334,056, dated Nov. 29, 2004, 22 pages.

Office Action issued in U.S. Appl. No. 10/633,636, dated Oct. 11, 2006, 9 pages.

Office Action issued in U.S. Appl. No. 10/746,232, dated Mar. 18, 2009, 26 pages.

Office Action issued in U.S. Appl. No. 10/981,460, dated Aug. 20, 2008, 24 pages.

Office Action issued in U.S. Appl. No. 11/015,423, dated Mar. 2, 2009, 33 pages.

Office Action issued in U.S. Appl. No. 11/015,424, dated Mar. 19, 2008, 43 pages.

Office Action issued in U.S. Appl. No. 11/015,424, dated May 1, 2009, 47 pages.

Office Action issued in U.S. Appl. No. 11/015,476, dated Mar. 2, 2009, 29 pages.

Office Action issued in U.S. Appl. No. 11/017,204, dated Jun. 23, 2008, 33 pages.

Office Action issued in U.S. Appl. No. 11/017,204, dated Dec. 12, 2007, 13 pages.

Office Action issued in U.S. Appl. No. 11/079,522, dated Apr. 3, 2009, 14, pages.

Office Action issued in U.S. Appl. No. 11/079,522, dated Oct. 16, 2008, 33 pages.

Office Action issued in U.S. Appl. No. 11/237,718, dated Apr. 2, 2009, 53 pages.

Office Action issued in U.S. Appl. No. 11/464,816, dated Apr. 21, 2009, 29 pages.

Supplementary European Search Report issued in European Application No. EP05728303, dated Jan. 09, 2009, (4 pages).

Supplementary European Search Report issued in European Application No. 05857099.5—1238/1836596 PCT/US2005045663, dated Nov. 07, 2008, (5 pages).

Ed Bott and Ron Person, Using Windows 95 with Internet Explorer 4.0, Feb. 17, 1998, Que, Special Edition, 21 pages.

Home-tribe.net, http://washingtondc.tribe.net/message/24434d1b-817b-4580-aa42-3bffa15f26a?page=1 (4 total pages).

http://www.friendster.com (17 pages).

McKendrick, Joseph; "Internet Call Centers: New Era in Customer Service"; Feb. 2002; V10, n2, pp. 22(4).

Neo Mai, Ken Neo. "Buying and selling on the internet; [Computimes, 2* Edition]." New Straits Times. Kuala Lumpur: Jun. 28, 2001. p. 53.

R. Movva & W. Lai, "MSN Messenger Service 1.0 Protocol", Aug. 1999, Internet Draft, http://toolsietf.org/id/draft-movva-msn-messenger-protocol-oo.txt, 28 pages.

Reichard, K., "AOL, ICQ to Interoperate—But in a Limited Fashion," Oct. 30, 2002, InstantMessagingPlanet, available at www.instantmessagingplanet.com/public/article.php/1490771.

Ryze home page, www.ryze.com, Dec. 21, 2003, available at http://web.archive.org/web/20031221010006/http://ryze.com, printed Mar. 16, 2005, 13 pages.

VisiblePath webpages, www.visiblepath.org, Dec. 3, 2003, available at http://web.archive.org/web/20031203132211/http://www.visiblepath.com, printed Mar. 16, 2005, 5 pages.

WebmasterWorld.com Inc., "HTML and Browsers", Mar. 5, 2001, Internet: www.webmaster.com/forum21/367.htm, 2 pages.

ZeroDegrees home page, www-zerodegrees.com, Jan. 24, 2004, available at http://web.archive.org/web/20040204153037/www.zerodegrees.com/home.htm, printed Mar. 16, 2005, 2 pages.

* cited by examiner

METHOD AND SYSTEM FOR CAPTURING INSTANT MESSAGES

CLAIM OF PRIORITY

This application claims priority under 35 USC §119(e) to U.S. Provisional Application Ser. No. 60/531,988, filed on Dec. 24, 2003 and U.S. Provisional Application Ser. No. 60/500,369, filed Sep. 5, 2003, the entire contents of each application is hereby incorporated by reference.

TECHNICAL FIELD

This disclosure generally relates to managing instant messages.

BACKGROUND

Instant messages are conversational in nature. To maintain their conversational character, instant messages typically are communicated in real time to a user based on an indication that the user presently is online. Nevertheless, the conversational nature of instant messaging may subject a user who is visible online to undesired real-time advances or interruptions from other online entities. For example, a user who enters an online chat room may be subjected in real-time to instant messages from other individuals, known or unknown to the user, as well as from commercial entities, some of whom may purvey undesirable spam. Having entered an instant messaging conversation with a friend, the user may find the conversation overwhelmed in a cacophony of competing instant messaging voices, each demanding the user's immediate attention. Although the user may use a knock-knock (e.g., a pop-up window that provide the user the option to accept or reject an individual instant message based, for example, on an identification of the sender) to screen instant messages from entities not on a contact list of the user, a knock-knock, like the instant message that it represents, is obtrusive and steals the focus of the user from other tasks or conversations that are at hand.

SUMMARY

In one general aspect, managing instant messages may include receiving instant messages created by or on behalf of one or more message sources for delivery to an intended recipient. From among the received instant messages, qualifying instant messages are identified that satisfy a capture rule, and two or more of the qualifying instant messages are captured. The intended recipient is informed of the captured instant messages unobtrusively and the intended recipient is enabled to manage the captured instant messages.

Implementations may include one or more of the following features. For example, identifying qualifying instant messages that satisfy a capture rule may include identifying received instant messages for which a message source does not correspond to a contact of the intended recipient. A received instant message also may be identified as a qualified instant message based on a degree of separation between the intended recipient and the message source. Unsolicited marketing messages may be identified as qualified instant messages based, for example, on a heuristic and/or a Bayesian method. When the intended recipient is away or prefers not to be disturbed, for example, all received instant messages may be identified as qualified instant messages.

The intended recipient may be informed unobtrusively of captured instant messages without stealing focus from another interface for each instant message that is captured. The intended recipient also may be informed when at least one instant message is captured using an unobtrusive audible or visible cue.

Enabling management of the captured instant messages may include enabling the intended recipient to respond to at least one of the captured instant messages and/or to access information related to a message source associated with the captured instant messages. The intended recipient may be enabled to delete, ignore or block a captured instant message and/or a source of a captured instant message. Further, subsequent instant messages related to a previously deleted, ignored or blocked message or message source, in turn, may be deleted, ignored or blocked without being presented to the intended recipient. In sum, the capture rule may be modified (e.g., automatically or by the intended recipient) based on instant messages previously qualified or captured, for example, to capture or to pass-through subsequent instant messages from the source of a previously captured instant message.

The captured instant messages may be organized and/or presented to the intended recipient according to a plurality of predetermined categories. The predetermined categories may include, for example, categories for known, unknown, trusted and/or un-trusted messages or messages sources. The organization and presentation of the captured instant messaged may be configured by the intended recipient and/or automatically by a computer. These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

Instant messaging is powerful in its ability to interject itself into the recipient's online experience in order to initiate or further a real-time online conversation. The capabilities of instant messaging may enhance collaboration, networking, and the social value of users' online experiences. Nonetheless, absent the ability to manage receipt of instant messages, a user may find the potential benefits of instant messaging lost in an unrequited babble of insignificant or objectionable instant message voices.

Figure 1:
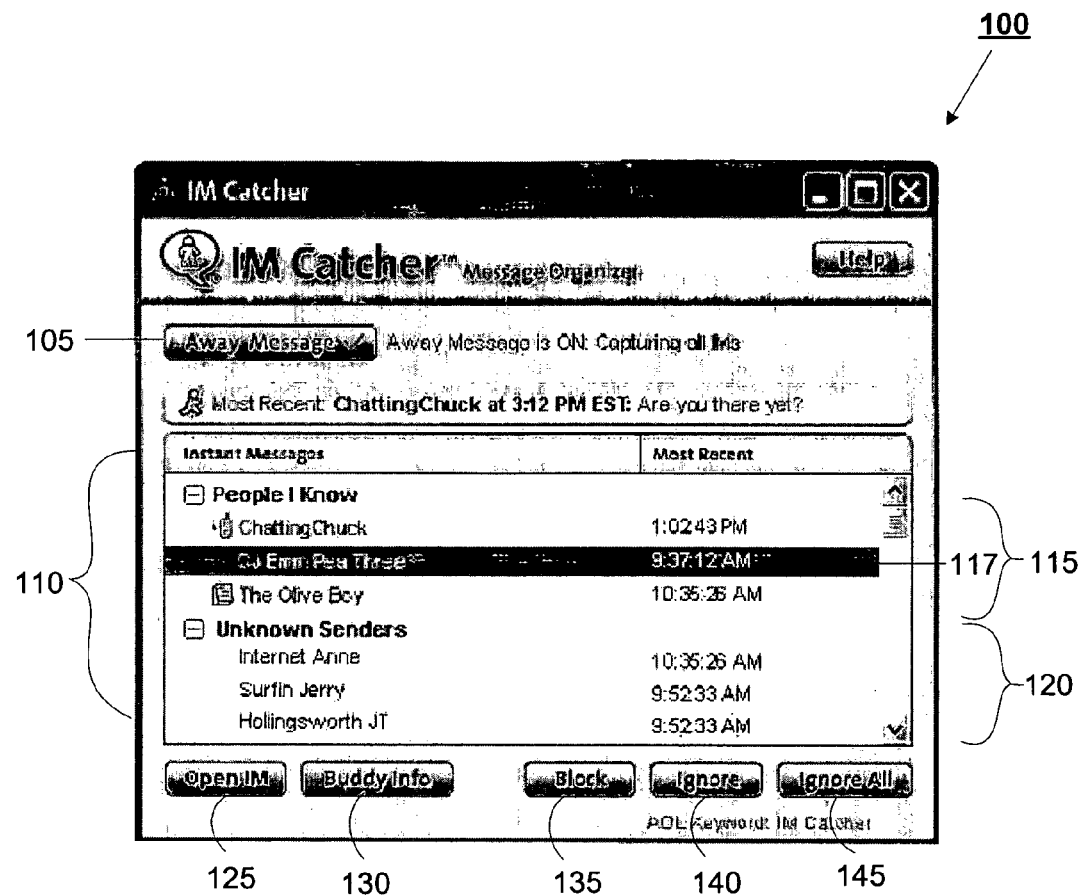
FIGS. 1-6 illustrate graphical user interfaces (GUIs) that may be used to manage instant messages directed to a user based on the user's online presence.

FIG. 1 illustrates a graphical user interface 100 (capture interface) that may be used to manage instant messages received by a user based on the user's online presence (e.g., the user's presence within a chat room or other online forum, and/or the user's present connection to the internet, using, for example, an internet service provider). Using button 105 (the "Away Message" button), the user has indicated to the capture interface 100 that the user presently is unavailable to receive instant messages. The capture interface 100, therefore, captures and organizes all of the instant messages 110 directed to the user while the user is away, and thereby provides the user with an effective and efficient way to handle the instant messages 110 upon returning.

The capture interface 100 is displayed initially when a first instant message is captured. When displayed initially, the capture interface 100 may pop to the front of all open windows or otherwise steal focus to alert the user of its activation. The capture interface 100 typically, however, will not steal focus upon receiving subsequent instant messages. To minimize distraction to the user, instant messages captured to the capture interface 100 do not generate a knock-knock when they are received and do not steal focus from other tasks or demand individualized attention of the user. Consequently, instant messages captured by the capture interface 100 may be deemed less intrusive by the user than instant messages presented to the user immediately or by using a knock-knock. The capture interface 100 may indicate the capture of additional instant messages using a subtle visible or audible cue, such as, for example, by playing a sound or by flashing an icon.

To assist the user in handling the instant messages 110, the instant messages 110 are categorized according to whether the message sender is known 115 or unknown 120 to the user. Furthermore, the instant messages within each category may be organized according to their time of receipt (as shown), or according to some other metric, such as, for example, a metric of anticipated importance or relevance. For each instant message 110 captured and categorized, the user is informed of an identity of the sender (e.g., a screen name) and the time at which the instant message was captured. Based on the information presented, the capture interface 100 enables the user to select a desired instant message, for example, instant message 117 from DJ Emma Pea Three.

Once an instant message is selected, the user may use a single click of a button to accept and open the instant message (using the "Open IM" button 125), to obtain more information regarding the message sender (using the "Buddy Info" button 130), to block all further instant messages from the sender of the instant message (using the "Block" button 135) or to ignore further instant messages from the sender of the instant message for the duration of the user's present online session (using the "Ignore" button 140). The user also may determine to ignore future instant message from all of the captured instant message senders for the duration of the user's online session (using the "Ignore All" button 145). The user may perform screening functions for a selected instant message without generating feedback or otherwise informing the sender of the user's attention to the instant message. Captured instant messages not handled expressly by the user, for example, may be deleted or ignored at the end of the user's online session or when the user closes the capture interface.

Figure 2:
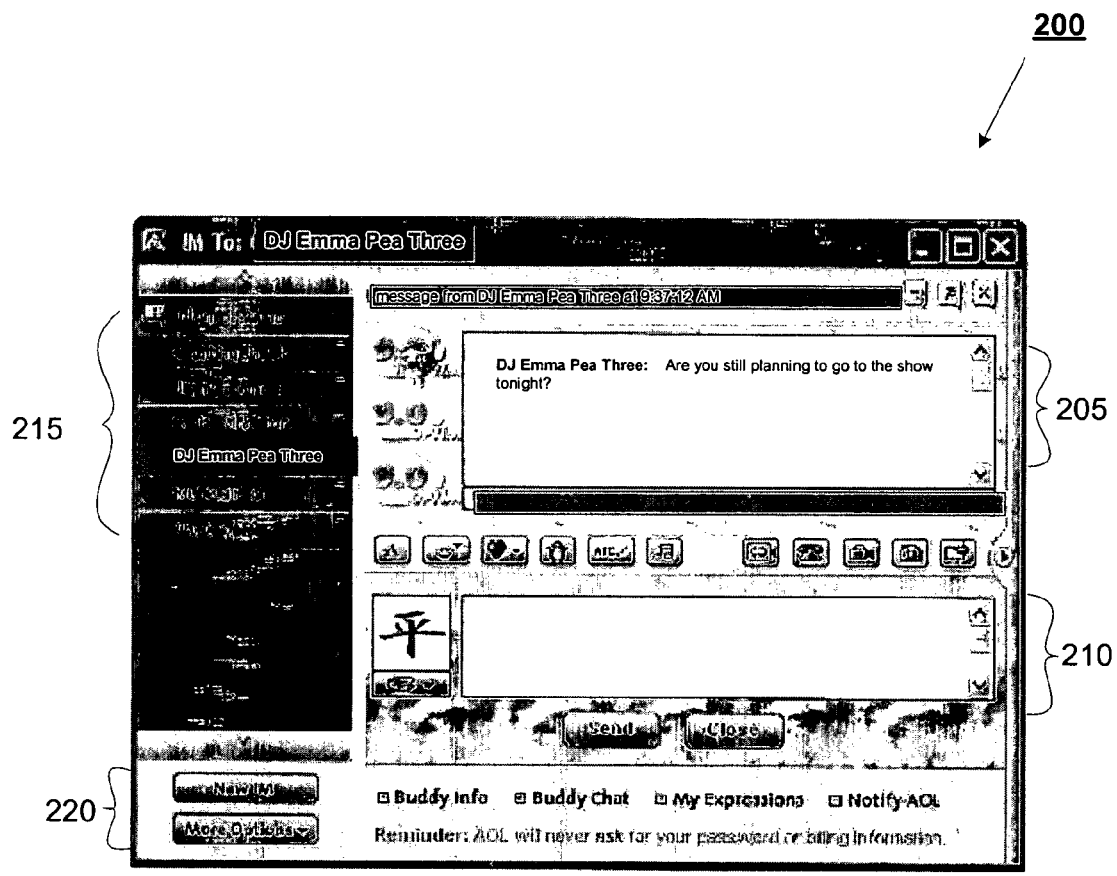

Referring to FIG. 2, the "Open IM" button 125 of the capture interface causes the selected instant message 117 to be presented to the user in a separate message interface 200. The message interface 200 includes a first pane 205 used to display the selected instant message 117 and a second pane 210 by which the user may compose and send an instant message reply. The message interface 200 includes tabs 215 to organize more than one active instant messaging conversation. The message interface 200 also may include controls (e.g., buttons 220) to access relevant instant messaging functionality, typically using only a single click.

Figure 3:
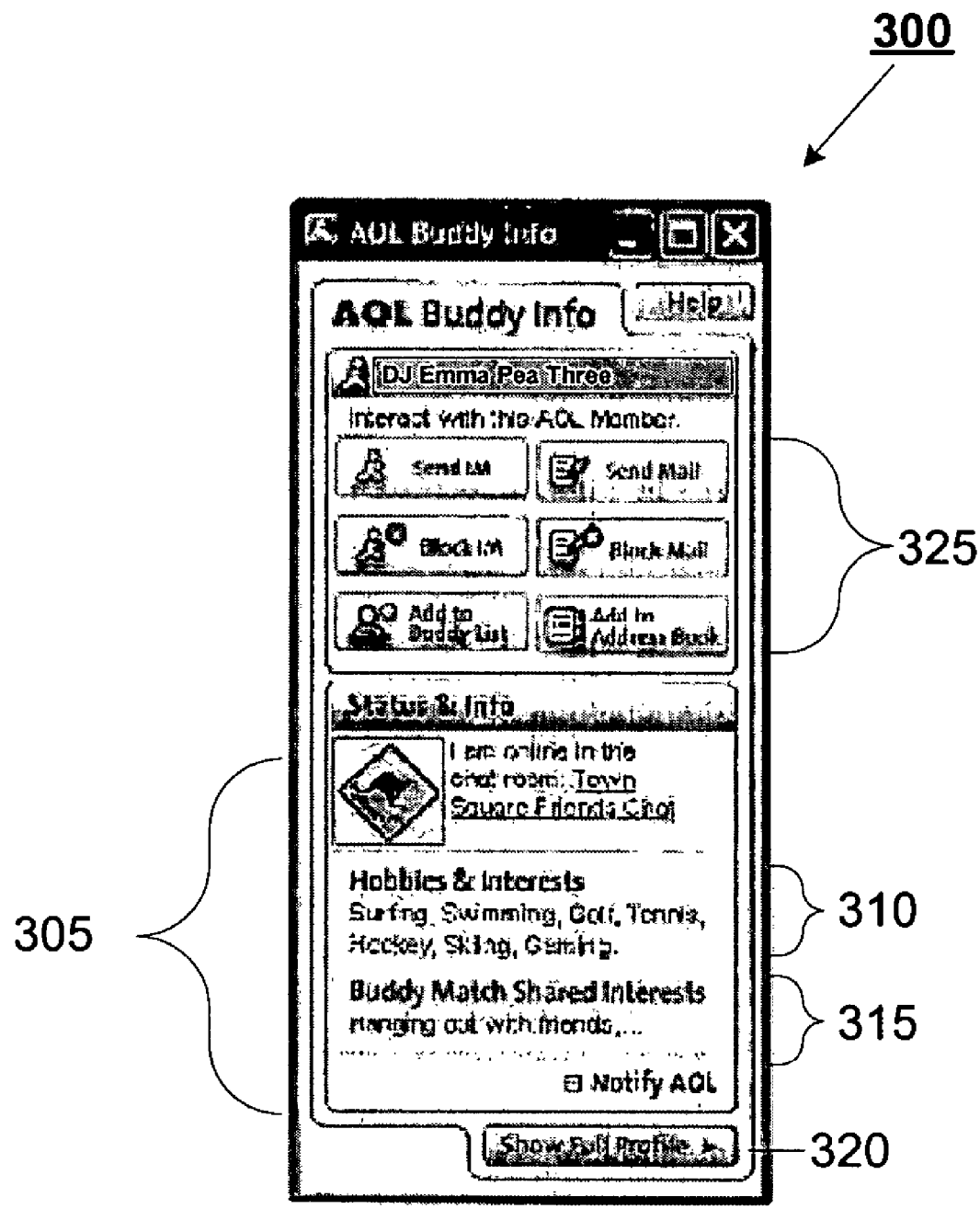

FIG. 3 illustrates a buddy info interface 300 invoked by activating the "Buddy Info" button 130 of the capture interface 100. The buddy info interface 300 provides additional information 305 regarding the sender, DJ Emma Pea Three, of instant message 117. For example, the buddy info interface 300 indicates that DJ Emma Pea Thee presently is online in the Town Square Friends Chat room. The buddy info interface also indicates hobbies and interests 310 of DJ Emma Pea Three as well as interests 315 that DJ Emma Pea Three shares with the user. Button 320 provides access to additional information regarding DJ Emma Pea Three, such as, for example, a phone number, an address, an email address, an age, a gender, family information, educational information, career information, and/or an expertise. Buttons 325 are provided to enable the user to access with one click basic instant messaging options related to DJ Emma Pea Three, such as, for example, to send or block instant messages to or from DJ Emma Pea Three or to add DJ Emma Pea Three to a contact list of the user. The user may use the information provided by the buddy info interface 300 to judge, for example, whether an unknown sender is a person (for whom additional information likely is available) or a software bot (for which additional information likely is not available).

Figure 4A:
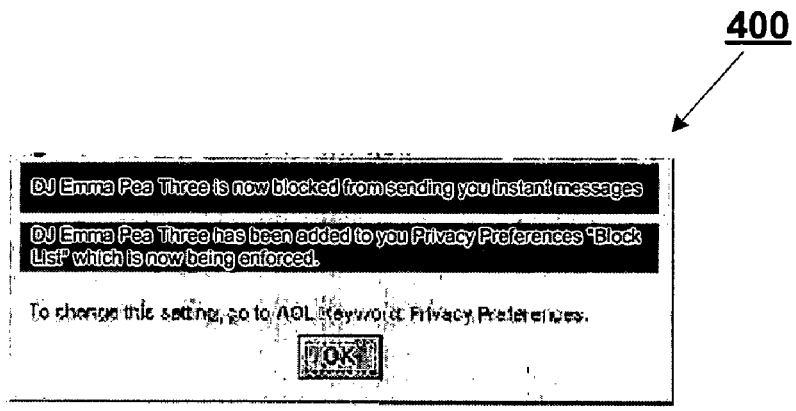
Figure 4B:
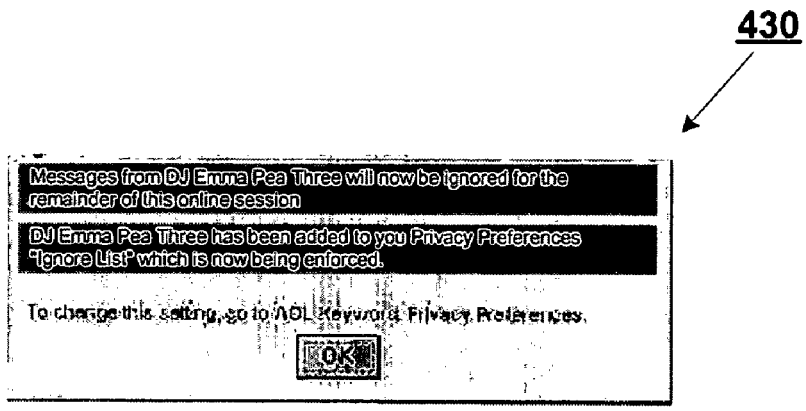
Figure 4C:
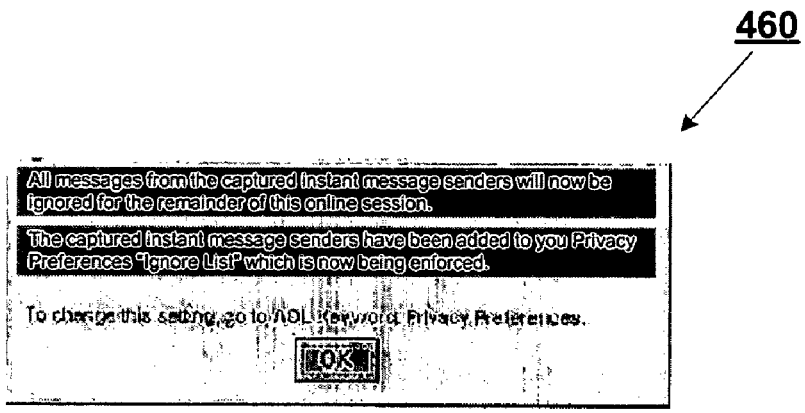

FIGS. 4A through 4C illustrate interfaces 400, 430 and 460 that are used, respectively, to confirm that the user desires to execute the screening function of the "Block" button 135, the "Ignore" button 140, or the "Ignore All" button 145 of the capture interface 100.

Figure 5:
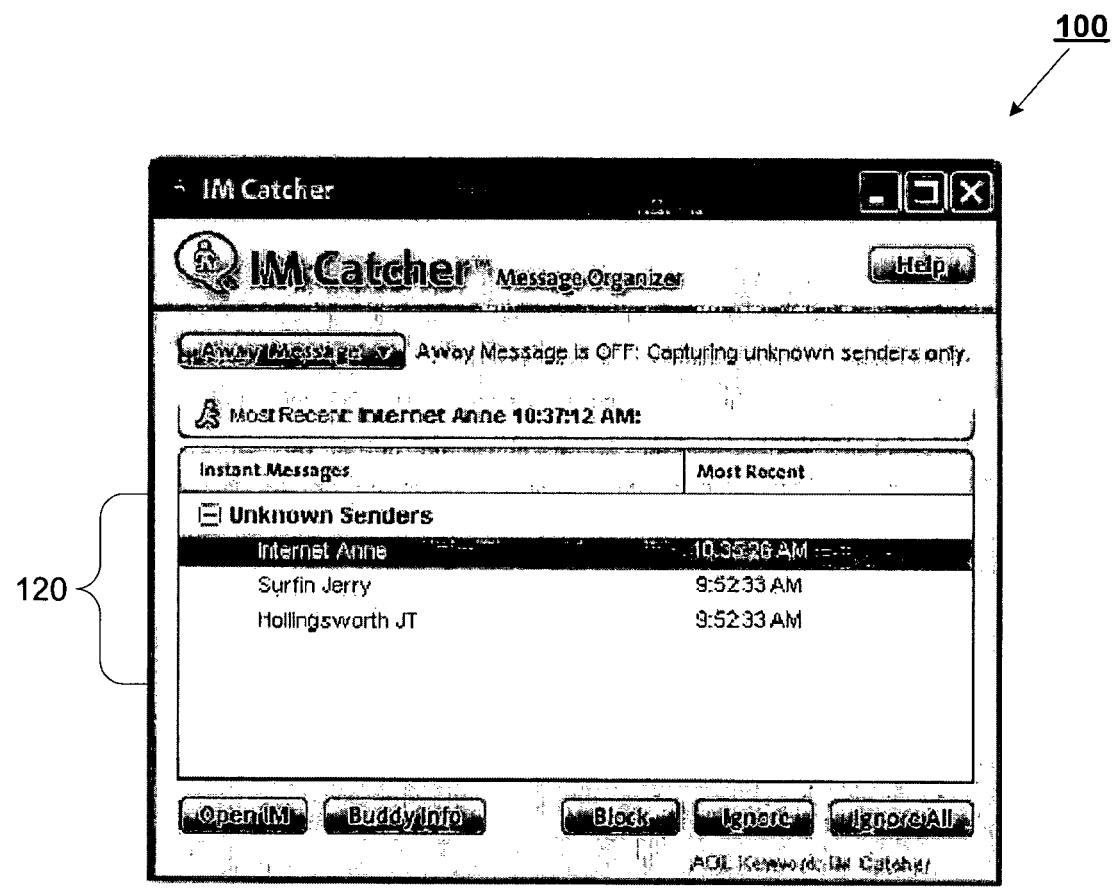
Figure 6:
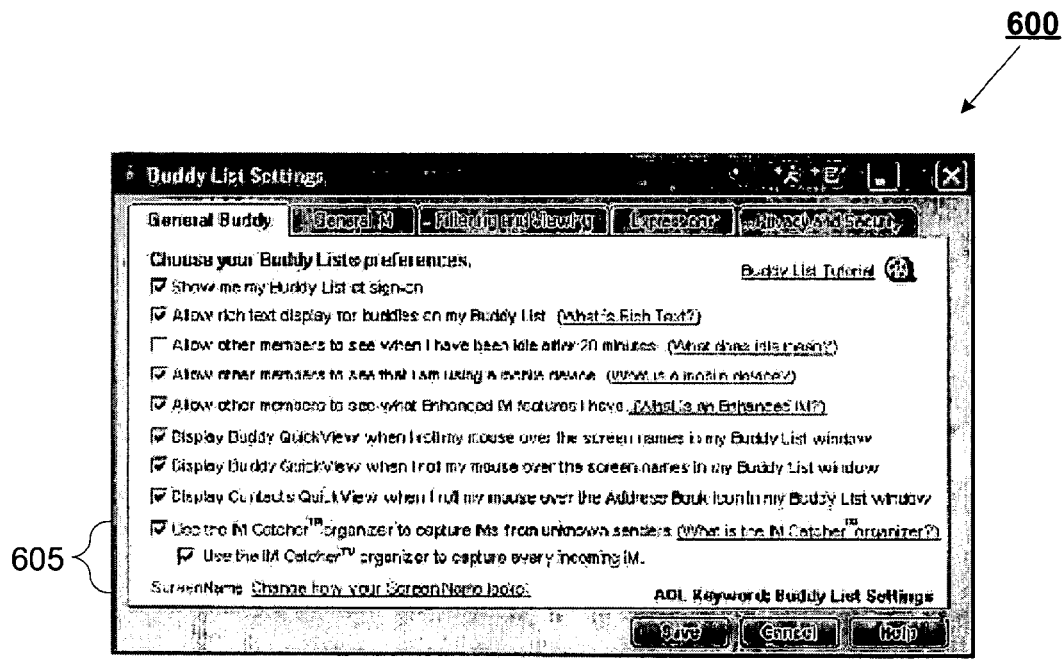

FIG. 5 illustrates the capture interface 100 in which the user is indicated to be present rather than away. The interface 100 is configured to capture only instant messages of unknown senders 120 when the user is present and to allow known senders to approach and interact freely with the user. Nevertheless, referring now to configuration interface 600 of FIG. 6, the user may use configuration settings 605 to configure the capture interface 100 to capture all instant messages, whether from known or unknown senders or whether the user is present or away. Additional configurations also may be provided, for example, to capture instant messages only of particular senders or to capture instant messages only at particular times or during particular contexts (e.g., when the user is engaged actively in a different instant message exchange that it would be perceived as rude to interrupt).

Figure 7:
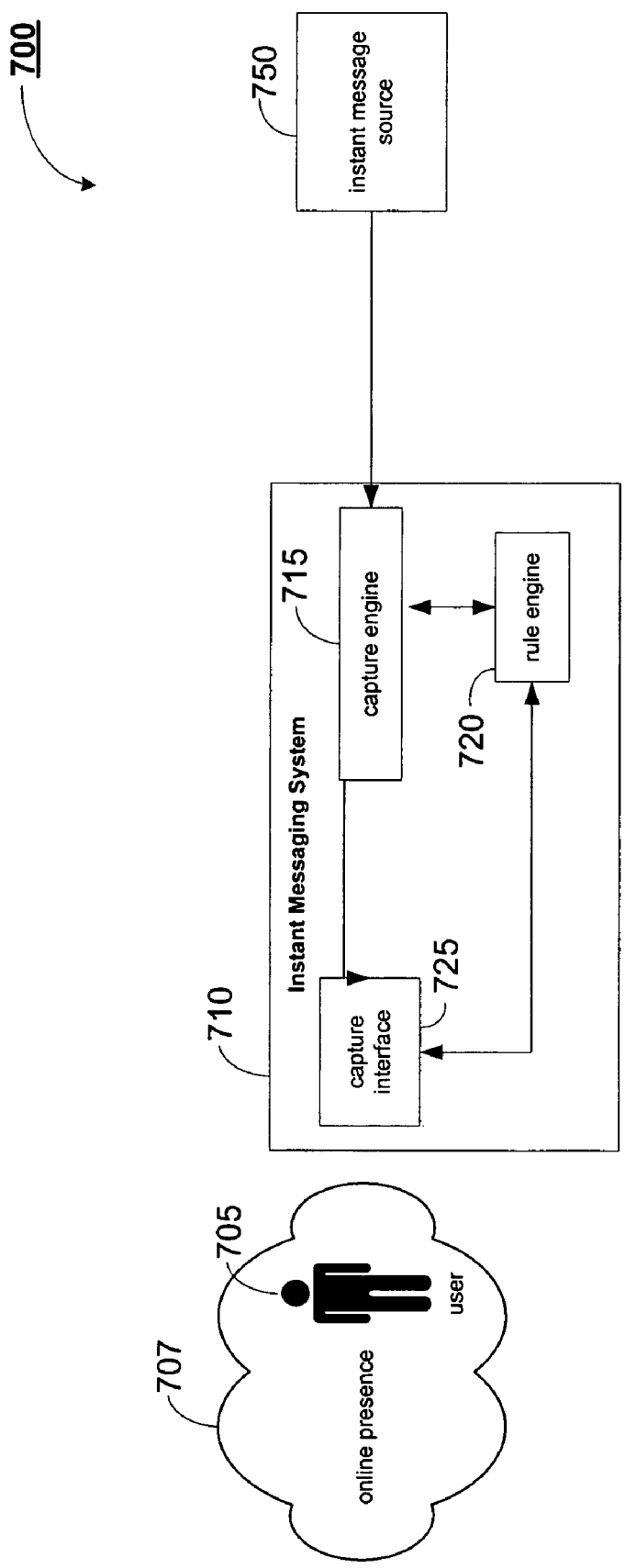
FIG. 7 is a schematic diagram of a communication system capable of managing instant messages directed to a user based on the user's online presence.

FIG. 7 shows a generalized system 700 for communicating instant messages to a user 705. System 700 includes an instant messaging system 710 that manages instant messages provided to the user 705 in real time by an instant message source 750 based on an online presence 707 of the user. Instant messaging system 710 may be implemented, for example, as a client system, as a host system, or as some combination of these or other systems. The instant messaging system 710 includes a capture engine 715, a rule engine 720, and a capture interface 725. The instant messaging system 710 may include or be included in a general-purpose or a special-purpose computer (e.g., a personal computer, a PDA, a mobile telephone, or a device specifically programmed to perform certain tasks), a database, a local area network, and/or a wide area network. The instant messaging system 710 may include any appropriate architecture or combination of architectures, such as for example, a client architecture and/or a host architecture.

The capture engine 715 is configured to capture one or more instant messages directed to the user 705 by the instant message source 750 based on interaction with the rule engine

720. The rule engine 720 compares incoming instant messages to a capture rule, and informs the capture engine 715 if the capture rule is satisfied. If the instant message satisfies the capture rule, the capture engine 715 captures the instant message to manage the instant message for the user 705. The capture interface 725 informs the user 705 of the captured instant messages in an organized fashion and without disrupting the user's other online activities. The capture interface 725 also enables the user 705 to respond to or to otherwise manage the captured instant messages.

The capture engine 715 captures the instant messages based on input from the rule engine 720 that the instant message satisfies a capture rule. The capture engine 715 may include a database to hold captured instant messages and may communicate information descriptive of the captured instant messages to the capture interface 725. The information descriptive of the captured instant messages may include, for example, an identifier of the message source, a time stamp of the instant message, a portion or summary of the instant message contents, and/or a pointer to the instant messages. In addition, or in the alternative, the capture engine 715 may tag or otherwise identify the instant messages as captured and may provide the captured instant message to the capture interface 725 for handling, storage and/or management.

The rule engine 720 enables the system or an administrator of the system to generate a capture rule. Alternatively, or in addition, the rule engine 720 may enable the user 705 or a supervisor of an online account of the user 705 to define one or more aspects of the capture rule. The capture rule may describe, in whole or in part, one or more conditions to be satisfied for an instant message to be captured. For example, the capture rule may base capture upon an identify of the message source 750, an attribute of the message, a preference or context (e.g., the user is away) of the user 705, or some combination of these or other factors. In any event, the rule engine 720 analyzes incoming instant message for satisfaction of the capture rule.

The capture interface 725 may be used to manage the instant messages directed to the user 705 while the user 705 is online. The capture interface 725 itself may receive and store the instant message or may reference and access instant messages captured and stored by another service, system or device (e.g., the capture engine 715). In any event, the capture interface 725 enables the user 705, for example, to organize, treat, respond to, block, or ignore the captured instant messages. The capture interface 725 also may enable the user 705 to modify the capture rule of the rule engine 720. For example, the capture interface 725 may enable the user to modify the capture rule directly, or may modify the capture rule automatically based upon treatment by the user 705 of one or more captured instant messages. Generally, the capture interface 725 may function similarly to capture interface 100 described with respect to FIGS. 1-6.

The instant message source 750 typically may include any source of an instant message. The instant message source 750 may employ one or more protocols to transfer information internally or to communicate the instant message to the user 705.

Both the instant messaging system 710 and the message source 750 further may include various mechanisms for delivering data. The various mechanisms may include, for example, any applications, protocols, devices, or networks used to facilitate communication of electronic data. Both the instant messaging system 710 and the message source 750 also may include or be included in a general-purpose or a special-purpose computer, a local area network, and/or a wide area network. The response to and execution of instructions received by the instant messaging system 710, the message source 750, or any of their components (collectively the system services), may be controlled by, for example, a program, a piece of code, an instruction, a device, a computer system, or a combination thereof, for independently or collectively instructing the system services to interact and operate as described herein.

Figure 8:
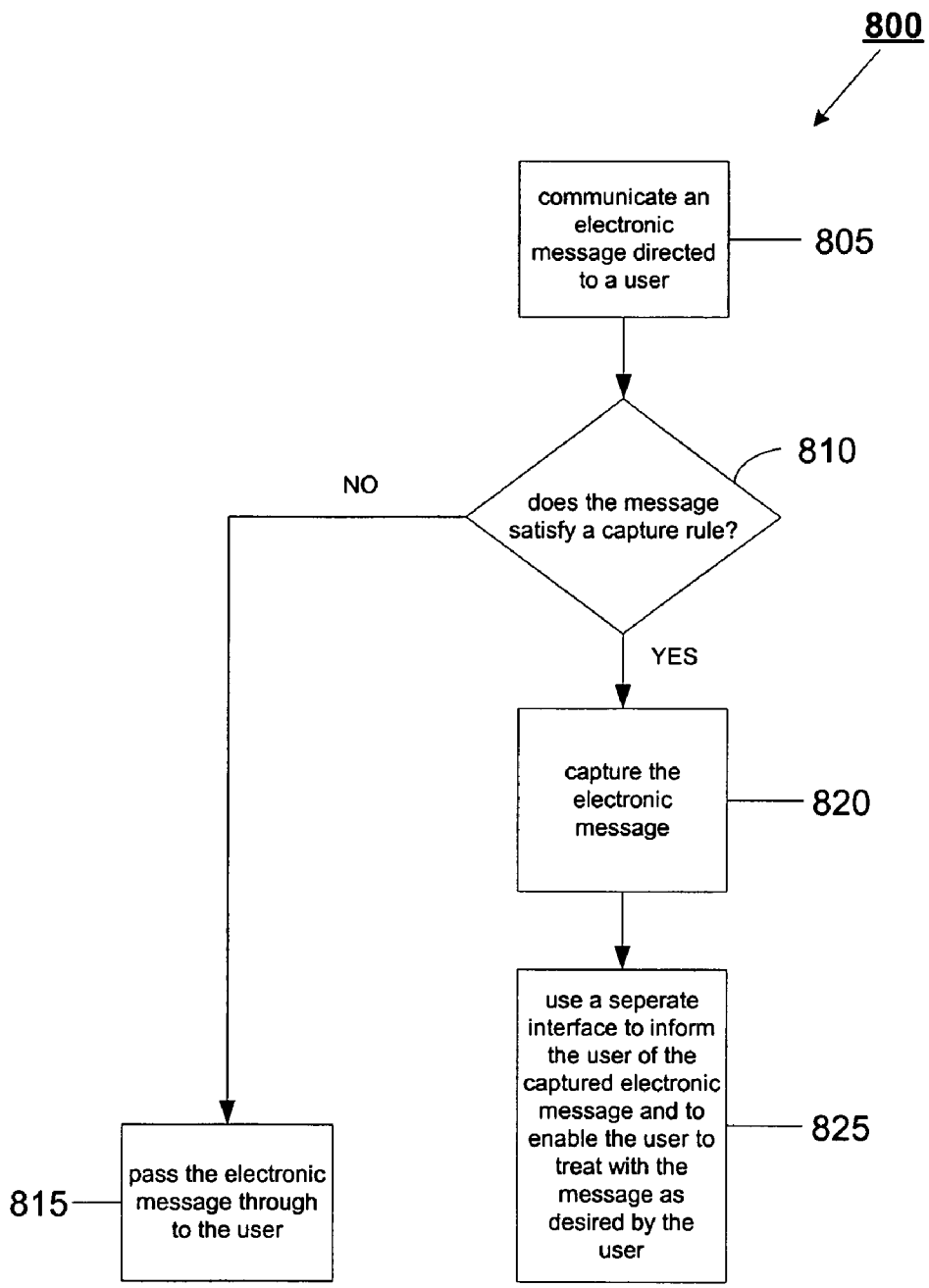
FIG. 8 is a flow diagram of a process implementable by the communication system of FIG. 7.

FIG. 8 illustrates a flow diagram of a process 800 implementable by, for example, the system 700 of FIG. 7 to manage instant messages directed to the user 705. The instant message source 750 communicates instant messages directed to the user 705 to the instant messaging system 710 (step 805). The capture engine 715 uses the rule engine 720 to determine whether the instant messages satisfy a capture rule (step 810). If an instant message fails to satisfy the capture rule, that instant message is not captured and, instead, is passed through to the user (step 815). Otherwise, when an instant message satisfies the capture rule, the capture engine 715 captures the instant message (step 820). To inform the user 705 of the captured instant messages, the capture engine 715 communicates the captured instant messages and/or information indicative of those messages to the capture interface 710 (step 825). The capture interface 725 enables the user 705 to handle the captured instant messages individually or as groups, and otherwise to respond to or to manage the instant messages as desired (step 825).

Figure 9:
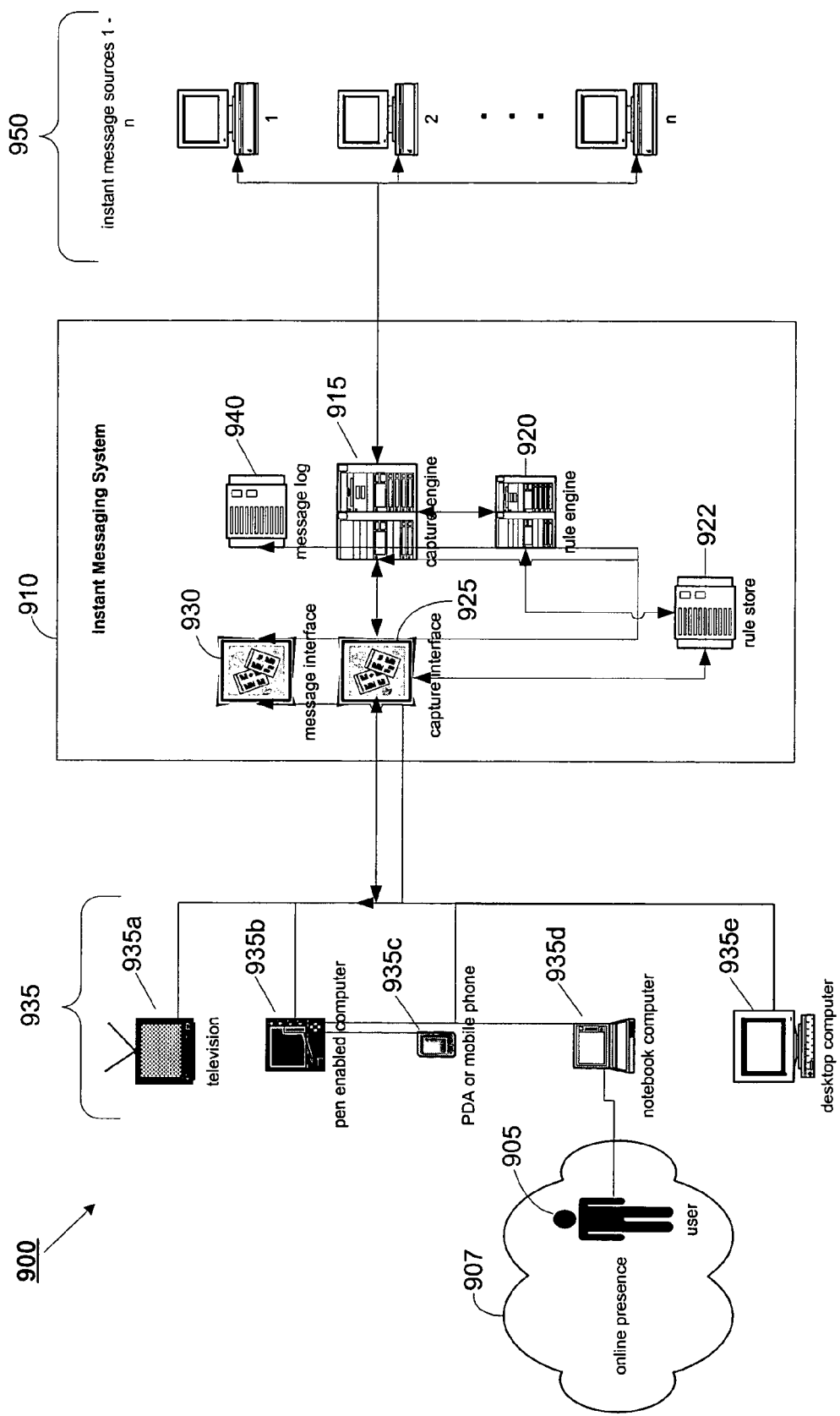
FIG. 9 is a schematic diagram of an instant messaging system that manages instant messages directed to a user based on the user's online presence.

Referring to FIG. 9, a generalized communication system 900 communicates instant messages generated by one or more instant message sources 950 to a user 905 having an online presence 907. The online presence 907 may include, for example, activity of the user 905 in browsing the internet, participating in an active instant messaging session, using an internet enabled television or game console, using a networked radio, or participating in a chat room discussion. The online presence 907 also may include an online presence of the user 905 at a particular device. Exemplary components of the communication system 900 are described in greater detail below.

The communication system 900 includes one or more message sources 950. The message sources 950 typically include different individuals, services, or other sources of instant messages, such as, for example, friends or family of the user 905, persons not known by the user 905, commercial entities, and/or one or more software bots that automatically direct messages to the user 905. The instant messages may include, for example, a personal message, a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; an online status of another user; or entertainment programming and/or ticket information. As a practical matter, the message sources 950 may provide many instant message to the user 905 that are unsolicited and/or undesired.

The message sources 950 may employ one or more protocols (i.e., standards, formats, conventions, rules, and structures) to transfer information internally or to communicate instant messages to the user. Protocols employed by the message sources 950 may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP), the simple mail transfer protocol (SMTP), the short message service (SMS), the enhanced message service (EMS), and/or the multimedia message service (MMS).

The communication system 900 includes an instant messaging system 910 that manages instant messages provided to the user 905 by the instant message sources 950 based on the online presence 907 of the user. The instant messaging system 910 includes a capture engine 915, a rule engine 920 having a rule store 922, a capture interface 925, and a message interface 930 (the system components). The instant messaging system 910 may include or be included in a general-purpose or a special-purpose computer (e.g., a personal computer, a PDA, a mobile telephone, or a device specifically programmed to perform certain tasks), a database, a local area network, and/or a wide area network. The instant messaging system 910 may include any appropriate architecture or combination of architectures, such as for example, a client architecture and/or a host architecture.

The instant messaging system 910 typically allows direct or indirect communication between the various system components, the user 905 and the instant message sources 950, irrespective of physical or logical separation. The instant message system 910 may include, for example, various mechanisms for communicating data, such as, for example, the short message service (SMS), the enhanced message service (EMS), the multimedia message service (MMS), the wireless application protocol (WAP), the transport connection protocol (TCP), the Internet protocol (IP), the World Wide Web, one or more local area networks, and/or one or more wide area networks. The instant messaging system 910 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying data. The communications of the instant message system 910 may employ secured and/or unsecured communication systems.

Components of the instant messaging system 910 are described in greater detail below.

The capture engine 915 corresponds generally to the capture engine 715 of FIG. 7. Capture engine 915 is configured to capture an instant message based on an indication by the rule engine 920 that a capture rule is satisfied. If the capture rule is not satisfied, then the capture engine 915 is configured to pass the instant message through to the message interface 930 for immediate display to the user 905. The capture engine 915 may or may not store the instant messages that are captured. For example, in one implementation, the capture engine 915 stores the captured instant messages and forwards information indicative of the instant messages to the capture interface. In another implementation, the capture engine 915 merely forwards to the capture interface 925 those instant messages identified for capture and the capture interface provides or obtains any required storage.

The rule engine 920 is configured to compare the instant messages to a capture rule of the rule store 922 and/or to analyze the instant message in view of the capture rule. The rule engine 920 may perform, for example, Bayesian or heuristic analysis of the instant messages based on the capture rule. The rule engine 920 is configured to inform the capture engine 915 when an instant message satisfies the capture rule.

Generally, the capture rule may define, in whole or in part, one or more conditions to be satisfied by the source, content, and/or timing of an instant message before capture of the instant message. The capture rule may be generated by the system or by an administrator of the system. The capture rule also may be based on preferences of the user, whether provided by the user or determined automatically by the system in view of user behavior. In short, the capture rule may enable the user 905 flexibly to manage which instant messages are received directly, which instant messages are blocked completely, and which instant message are captured to be screened by the user 905.

The capture rule may include a white list defining approved instant message sources 950 (e.g., family, friends, or co-workers) and/or a black list defining objectionable instant message sources 950 (e.g., known purveyors of offensive spam) that are to be blocked. The white list and/or black list may be based on input of a rating authority or by a community of raters. Although the white list or the black list may be provided initially as a default, the user may be enabled to modify or replace either the white list or the black list to better fit the user's preferences.

Message source categories (e.g., individual, business, or business:gambling) also may be used to control communication with instant message sources 950 that include an associated category label. For example, a message source 950 may be identified as an online casino by an associated category label of "business:gambling" and may be restricted based on that label. Generally, to communicate an instant message to the user 905, a message source may be required to provide meaningful and trustworthy information by which the message source may be identified and/or classified.

The capture rule also may control capture, filtering, or ranking of an instant message based on a degree of separation between the user 905 and the message source 950 under a rationale, for example, that the user is more inclined to receive an instant message from a friend of a friend than from an individual not connected to the user. More specifically, the degree of separation between the user 905 and the message source 950 describes a number of intermediary relationships needed to link the user and the message source. Typically, user contact lists (e.g., address book, buddy list, and/or white list) are evaluated to determine the number of degrees (or relationships) needed to link two users.

Figure 10:
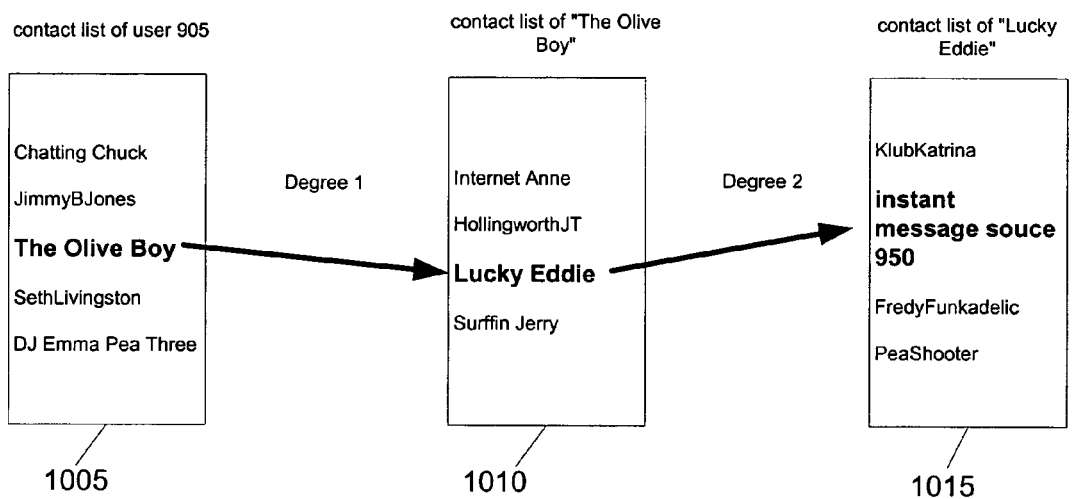
FIG. 10 illustrates a relationship between a user and an instant message source having two degrees of separation.

Referring briefly to FIG. 10, for example, the user 905 may link to the instant message source 950 through two degrees of separation based on contact lists of the user, "The Olive Boy," and of "Lucky Eddie." More specifically, the user has a contact list 1005 that lists "The Olive Boy." The contact list 1010 of "The Olive Boy," in turn, lists "Lucky Eddie," whose contact list 1015 lists the instant message source 950—and establishes the connection between the user 905 and the message source 950. Here, the user 905 is linked to the message source 950 by two degrees of separation (the relationship between "The Olive Boy" and "Lucky Eddie" providing the first degree, and the relationship between "Lucky Eddie" and the instant messaging source 950 providing the second degree). Stated differently, the user 905 is related to "Lucky Eddy" by one degree of separation (i.e., their common relationship to "The Olive Boy"), and "The Olive Boy" is separated from the instant message service 950 by one degree of separation (i.e., their common relationship to "Lucky Eddie"). Similarly, the user 905 and "The Olive Boy," "The Olive Boy" and "Lucky Eddie," and "Lucky Eddie" and the instant message source 950 each respectively are separated by zero degrees of separation.

In short, the capture rule may control capturing, filtering, or ranking of an instant message based on: (1) whether the user 905 and the messages source 950 are discernibly linked; and (2) if they are linked, the number of degrees of separation (e.g., relationships or intermediaries) needed to complete the link.

Referring back to FIG. 9, the capture rule also may include other rule information, such as, for example, key words and/or parameters useful for analyzing natural language. The capture rule may enable the rule engine 920 to restrict instant messages based upon textual analysis of their content. More specifically, the capture rule may enable the rules engine 920 to analyze the language of an instant message to determine whether the instant message includes offensive language or subject matter, or whether the language used is indicative of an unsolicited spam message. The user may be enabled to select or modify the information or algorithms used to screen the online content based on the textual analysis. For example, the capture rule may include user defined dictionaries of terms that may cause an instant message to be delivered immediately, blocked, or passed through when included in the instant message.

The capture rule may enable the user to specify times during which instant messages may or may not be received. For example, the user may restrict receipt of instant messages between the hours of 8:30 am and 5 pm during the work week, but may allow instant messages to be received with less restriction during the evenings and on the weekends while the user is not at work. More specifically, the user may use the capture rule to specify that, during working hours, instant messages of co-workers or clients are to be received, spam messages are to be blocked, and messages from friends or family are to be captured. On the other hand, when not at work, instant messages from co-workers and clients may be captured while messages from friends and family are received immediately.

Additional rule information also may be included, such as, for example, logging or reporting rules. The logging or reporting rules, for example, may indicate provision of a message log 940 to record all of the instant messages directed to the user 905 whether in the present or a past online session. The message log 940 may record whether the instant message was captured and what, if any, activity the user took with respect to the instant message.

The rule store 922 generally receives, stores and administers rule information used to supervise instant messaging by the instant messaging system 910. The rule store 922 may include one or more databases that may reside at any appropriate location (e.g., local location, remote location, or third party location), and also may reside on any appropriate storage medium, such as, for example, a magnetic disc array, or an optical disk array. These databases may be included in a single physical or logical structure, or they may be physically or logically distinct. The rule store 922 generally includes a data structure that enables the rule information and/or other information to be organized and accessed quickly and efficiently. For example, the rule store 922 may organize rule information using fields, records, or files. The rule store 922 may include database management systems that organize data based on relational, network, flat, or hierarchical architectures. The rule store 922 also may include a hypertext database to link data objects such as text, images, or video to other data objects. The rule store 922 may store the rule information locally, remotely, or in a distributed fashion. In any event, the rule store 922 organizes the rule information for effective access and use by the rule engine 920.

Capture interface 925 may function similarly to capture interface 100 described with respect to FIGS. 1-6. The capture interface 925 receives captured instant messages or information indicative of those messages from the capture engine 915 for display to the user 905. The capture interface, alone or in conjunction with other services, may perform sorting, prioritizing, or other types of organizational processing on the captured instant messages to enable the user 905 to manage the instant messages. For example, the capture interface 925 may prioritize captured instant messages based on a predicted relevance or likelihood of interest. The predicted relevance or likelihood of interest may be related to the subject matter and/or source of an instant message. For example, the capture interface 925 may give a higher priority to an instant message from an individual not known to the user but who is indicated to share a common interest than is given to an instant message from a software bot that presents a marketing invitation having objectionable content.

The capture interface 925 also may enable the user 905 to modify the capture rule of the rule engine 920. For example, the capture interface 925 may enable the user to modify the capture rule directly, or may modify the capture rule automatically based upon treatment by the user 905 of one or more captured instant messages. The capture interface 925 may display to the user 905 a source of an instant message, a time stamp, a count of the number of instant messages sent and/or received, a summary of instant message content, and/or the captured instant messages themselves. The capture interface 925 may enable the user to approve, block or ignore one or more instant messages or instant message sources. Generally, the capture interface 925 enables the user 905 to organize, respond to, block, ignore, or otherwise manage instant messages in a manner similar to that which was described with respect to the interfaces of FIGS. 1-6.

The capture interface 925 may include or operate in conjunction with one or more of the fixed or mobile communication devices 935, whether wired or wireless. The fixed or mobile communication devices 935 may include any device, system, and/or piece of code that relies on another service to perform an operation. For example, the communication devices 935 may include a device such as a television 935a, a pen-enabled computer 935b, a personal digital assistant (PDA) or mobile telephone 935c, a notebook computer 935d, and/or a desktop computer 935e. The communication devices 935 also or alternatively may include, for example, a Web browser, an instant messaging (IM) client, a synchronization client (e.g., a calendar synchronization client or a task list synchronization client), a short message service (SMS) client, a business productivity application (e.g., a word processing program or a spreadsheet program), and/or an operating system or operating system kernel residing on a device. The communication devices 935 may be arranged to operate within or in concert with one or more other systems, such as, for example, the Internet, the World Wide Web, a WAN (wide area network), a LAN (local area network), analog or digital wired and wireless telephone networks (e.g., PSTN, ISDN, or XDSL), radio, television, cable, satellite, and/or any other delivery mechanism for carrying data. In any event, the capture interface 925 enables the user 905, for example, to organize, treat, respond to, block, or ignore the captured instant messages.

One or more other services may be included in the components of communication system 900 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a database, a local area network, and/or a wide area network. In any event, the response to and execution of instructions received by any or all of the system services may be controlled by, for example, a program, a piece of code, an instruction, a device, a computer system, or a combination thereof, for independently or collectively instructing the services to interact and operate as described herein.

Figure 11:
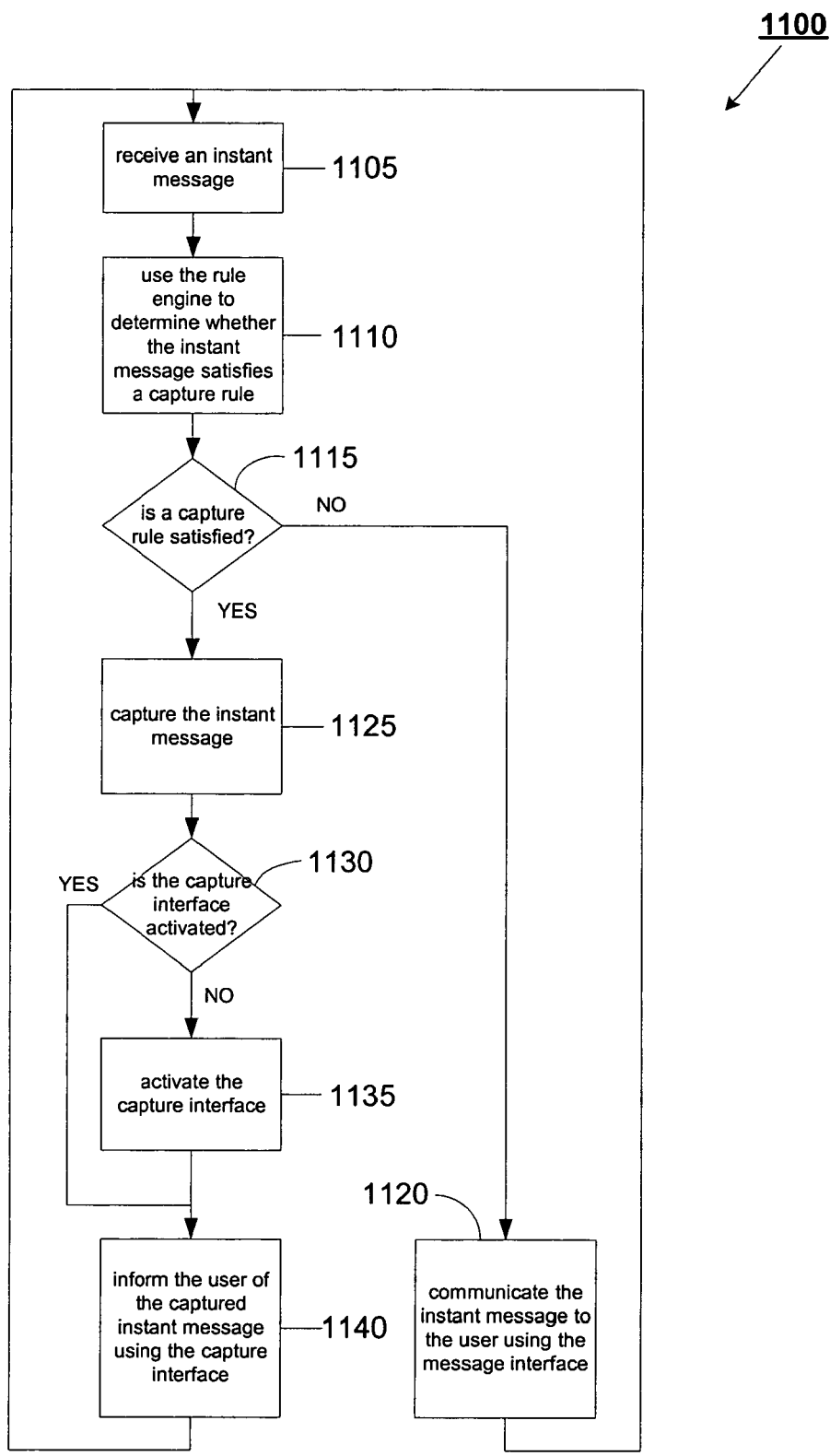
FIG. 11 is a flow diagram illustrating an exemplary process implementable by the system of FIG. 9.

FIG. 11 illustrates a flow diagram of a process 1100 implementable by, for example, the system 900 of FIG. 9 to manage instant messages directed to the user 905. An instant message initially is received from a message source 950 by the capture engine 915 (step 1105). The rule engine 920 is used to determine whether the instant message satisfies a capture rule (step 1110). If a capture rule is not satisfied (step 1115), the instant message is communicated to the user 905 using the message interface to grab the user's immediate attention (step 1120). The system then waits for receipt of the next instant message directed to the user 905 (step 1105).

If a capture rule is satisfied (step 1115), the instant message is captured by the capture engine 915 (step 1125). The capture interface 925 may be configured to be activated automatically when a first instant message is captured during an online session. In addition, or in the alternative, the capture interface 925 may be configured to be activates based on an input or a request of the user 905. If the capture interface 925 is not activated already (step 1130), then the instant messaging system 910 activates the capture interface 925 (step 1135). In any event, once the capture interface is activated (step 1135) or is determined already to be active (step 1130), the instant message and/or information indicative of the instant message is communicated to the capture interface 925 to inform the user 905 of the instant message and to enable the user to manage the instant message and any other instant messages that have been captured (step 1140). The system then waits for receipt of the next instant message directed to the user 905 (step 1105).

Other implementations are within the scope of the following claims.

What is claimed is:

1. A system to manage instant messages, the system comprising:
   at least one processing device;
   a storage storing instructions, which when implemented, cause the processing device to implement:
      an input interface configured to receive instant messages created by or on behalf of one or more message sources for delivery to an intended recipient;
      a degree of separation component configured to determine a degree of separation between the intended recipient and the message source, wherein the degree of separation indicates a number of intermediary relationships linking the intended recipient and the message source;
      a screening component configured to:
         identify, from among the received instant messages, qualifying instant messages that satisfy a capture rule, wherein the capture rule indicates that an instant message qualifies for capture if the degree of separation between the intended recipient and the message source exceeds a pre-determined threshold, and
         capture as captured instant messages two or more of the qualifying instant messages; and
      an output interface configured to inform the intended recipient unobtrusively of the captured instant messages and to enable the intended recipient to manage the captured instant messages.

2. The system of claim 1 wherein the output interface enables the intended recipient to modify the capture rule based on at least one of the captured instant messages.

3. The system of claim 2 wherein the output interface further enables the intended recipient to indicate that future instant messages from the source or sources of the at least one of the captured instant messages are to be blocked.

4. The system of claim 3 further comprising instructions that cause the processing device to implement a blocking component that captures and deletes the future instant messages without presenting the future instant messages to the intended recipient.

5. The system of claim 2 wherein the output interface further enables the intended recipient to indicate that future instant messages from the source or sources of the at least one of the captured instant messages are not to be captured.

6. The system of claim 1 wherein the output interface enables the intended recipient to organize the captured instant messages according to a plurality of predetermined categories.

7. The system of claim 6 wherein the output interface is configured to inform the intended recipient of the captured instant messages according to the plurality of predetermined categories.

8. The system of claim 6 wherein the predetermined categories include a category for captured instant messages received from message sources known to the intended recipient.

9. The system of claim 6 wherein the predetermined categories include a category for captured instant messages received from message sources not known to the intended recipient.

10. The system of claim 6 wherein the predetermined categories include a category for captured instant messages received from message sources trusted by the intended recipient.

11. The system of claim 6 wherein the predetermined categories include a category for captured instant messages received from message sources not trusted by the intended recipient.

12. The system of claim 1 wherein the capture rule indicates that an instant message qualifies for capture if the instant message is identifiable as an unsolicited marketing message.

13. The system of claim 12 wherein the screening component is configured to determine whether the instant message comprises an unsolicited marketing message based on a heuristic method.

14. The system of claim 12 wherein the screening component is configured to determine whether the instant message comprises an unsolicited marketing message based on a Bayesian method.

15. The system of claim 1 further comprising instructions that cause the processing device to implement a contact list of the intended recipient, wherein the capture rule indicates that an instant message qualifies for capture if the message source of the instant message does not correspond to a contact of the contact list.

16. The system of claim 1 wherein the capture rule indicates that an instant message qualifies for capture if the intended recipient is indicated to be away.

17. The system of claim 1 wherein the capture rules indicates that all received instant messages are to be captured, ignored, or blocked.

18. The system of claim 1 wherein the output interface enables the intended recipient to respond to at least one of the captured instant messages.

19. The system of claim 1 wherein the output interface enables the intended recipient to delete at least one of the captured instant messages.

20. The system of claim 1 wherein the output interface enables the intended recipient to ignore or block at least one of the captured instant messages.

21. The system of claim 1 wherein the output interface enables the intended recipient for at least one of the captured instant messages to access information related to a message source associated with the captured instant message.

22. The system of claim 1 wherein the output interface is configured to inform the intended recipient of the captured instant messages without stealing focus from another interface for each qualifying instant message that is captured.

23. The system of claim 1 wherein the output interface is configured to generate an unobtrusive audible or visible cue when at least one of the qualifying instant messages is captured.

24. The system of claim 1 wherein the screening component comprises:
- a rule engine configured to identify from among the received instant messages qualifying instant messages that satisfy the capture rule; and
- a capture engine configured to capture as captured instant message the two or more of the qualifying instant messages.

25. A computer readable storage medium storing a computer program, the computer program comprising:
- a receiving code segment that causes a computer to receive instant messages created by or on behalf of one or more message sources for delivery to a user;
- a degree of separation code segment that causes a computer to determine a degree of separation between the user and the message source, wherein the degree of separation indicates a number of intermediary relationships linking the user and the message source;
- a screening code segment that causes a computer to identify, from among instant messages intended for the user, qualifying instant messages that satisfy a capture rule, and to capture as captured instant messages two or more of the qualifying instant messages, wherein the capture rule indicates that an instant message qualifies for capture if the degree of separation between the user and the message source exceeds a pre-determined threshold; and
- an interface code segment that causes the computer to inform the user unobtrusively of the captured instant messages and to enable the user to manage the captured instant messages.

26. The computer medium of claim 25 wherein the interface code segment further comprises an organization code segment that causes the computer to organize the captured instant messages according to a plurality of predetermined categories.

27. The computer medium of claim 26 wherein the predetermined categories include a category for captured instant messages of message sources trusted by the user.

28. The computer medium of claim 26 wherein the predetermined categories include a category for captured instant messages of message sources not trusted by the user.

29. The computer medium of claim 25 wherein the interface code segment further comprises a learning code segment that causes the computer to modify the capture rule based on at least one of the captured instant messages.

30. The computer medium of claim 29 wherein the learning code segment further causes the computer to modify the capture rule based on a source of at least one of the captured instant messages.

31. The computer medium of claim 25 further comprising a contacts code segment that causes the computer to access a contact list of the user, wherein the capture rule comprises a contacts parameter requiring capture if at least one source of an instant message does not correspond to a contact of the contact list.

32. The computer medium of claim 25 wherein the capture rule comprises a SPAM parameter to control capture of an instant message identifiable as an unsolicited marketing message.

33. The computer medium of claim 25 wherein the capture rules comprises a do-not-disturb parameter to control whether all instant messages are to be captured, ignored, or blocked.

34. The computer medium of claim 25 wherein the interface code segment further comprises a response code segment that causes the computer to enable the user to respond to at least one of the captured instant messages.

35. The computer medium of claim 25 wherein the interface code segment further comprises a housekeeping code segment that causes the computer to enable the user to delete, ignore or block at least one of the captured instant messages.

36. The computer medium of claim 25 wherein the interface code segment further comprises a query code segment that causes the computer to access information related to a message source of a captured instant message.

37. The computer medium of claim 25 wherein the interface code segment further includes a focus preservation code segment that causes the computer to inform the user of the captured instant messages without stealing focus from another interface for each qualifying instant message that is captured.

38. The computer medium of claim 25 wherein the interface code segment further comprises an alert code segment that causes the computer to generate an unobtrusive audible or visible cue when at least one of the qualifying instant messages is captured.

39. A computer-implemented method of managing instant messages, the method comprising:
- receiving instant messages created by or on behalf of one or more message sources for delivery to a user;
- determining a degree of separation between the user and the message source, wherein the degree of separation indicates a number of intermediary relationships linking the user and the message source;
- identifying, from among the received instant messages, qualifying instant messages that satisfy a capture rule, wherein the capture rule indicates that an instant message qualifies for capture if the degree of separation between the user and the message source exceeds a pre-determined threshold;
- capturing two or more of the qualifying instant messages; and
- informing the user unobtrusively of the captured instant messages and enabling the user to manage the captured instant messages.

40. The method of claim 39 wherein enabling the user to manage the captured instant messages includes enabling the user to modify the capture rule based on at least one of the captured instant messages.

41. The method of claim 40 wherein enabling the user to manage the captured instant messages includes enabling the user to modify the capture rule based on a source of at least one of the captured instant messages.

42. The method of claim 39 wherein identifying qualifying instant messages that satisfy the capture rule includes identifying as qualifying instant messages those messages in which at least one message source does not correspond to a designated contact of the user.

43. The method of claim 39 wherein identifying qualifying instant messages that satisfy the capture rule includes identifying unsolicited marketing messages as qualifying instant messages.

44. The method of claim 39 wherein identifying qualifying instant messages that satisfy the capture rule includes identifying all the received instant messages.

45. The method of claim 39 wherein informing the user unobtrusively of the captured instant messages includes informing the user of the captured instant messages without stealing focus from another interface for each qualifying instant message that is captured.

46. The method of claim 39 wherein informing the user unobtrusively of the captured instant messages includes generating an unobtrusive audible or visible cue when at least one of the qualifying instant messages is captured.

47. The method of claim 39 wherein enabling the user to manage the captured instant messages includes enabling the user to respond to at least one of the captured instant messages.

48. The method of claim 39 wherein enabling the user to manage the captured instant messages includes enabling the user to delete, ignore or block at least one of the captured instant messages.

49. The method of claim 39 wherein enabling the user to manage the captured instant messages includes enabling the user to access information related to a message source of one of the captured instant message.

50. The method of claim 39 wherein enabling the user to manage the captured instant messages includes enabling the user to organize the captured instant messages according to a plurality of predetermined categories.

51. A system to manage instant messages, the system comprising:
   at least one processing device;
   a storage storing instructions, which when implemented, cause the processing device to implement:
      an input interface configured to receive instant messages created by or on behalf of one or more message sources for delivery to an intended recipient that is logged into the instant messaging system;
      a screening component configured to:
         identify, from among the received instant messages while the intended recipient is logged into the instant messaging system, qualifying instant messages that satisfy a capture rule, wherein the capture rule indicates that an instant message qualifies for capture based on an online status of the intended recipient, and
         capture as captured instant messages two or more of the qualifying instant messages; and
      an output interface configured to inform the intended recipient unobtrusively of the captured instant messages and to enable the intended recipient to manage the captured instant messages.

52. A computer-implemented method of managing instant messages, the method comprising:
   receiving instant messages created by or on behalf of one or more message sources for delivery to a user;
   identifying, from among the received instant messages, qualifying instant messages that satisfy a capture rule;
   capturing two or more of the qualifying instant messages; and
   presenting the user with a captured message interface that enables the user to:
      view a list of all captured instant messages; and
      select one instant message from the list of captured instant messages and respond to the selected captured instant message in a new instant messaging window.

* * * * *